(12) United States Patent
Rodrigues et al.

(10) Patent No.: US 12,551,840 B2
(45) Date of Patent: Feb. 17, 2026

(54) METHOD AND APPARATUS FOR SEPARATING CARBON DIOXIDE FROM A RESIDUAL GAS IN A FLUIDISED BED CATALYTIC CRACKING PLANT (FCC)

(71) Applicant: L'Air Liquide Société Anonyme pour l'Etude et l'Exploitation des Procédés Georges Claude, Paris (FR)

(72) Inventors: Guillaume Rodrigues, La Queue en Brie (FR); Richard Dubettier-Grenier, La Varenne Saint Hilaire (FR)

(73) Assignee: L'Air Liquide, Societe Anonyme Pour l'Etude et l'Exploitation des Procedes Georges Claude, Paris (FR)

( * ) Notice: Subject to any disclaimer, the term of this patent is extended or adjusted under 35 U.S.C. 154(b) by 837 days.

(21) Appl. No.: 17/786,956

(22) PCT Filed: Dec. 10, 2020

(86) PCT No.: PCT/EP2020/085450
§ 371 (c)(1),
(2) Date: Jun. 17, 2022

(87) PCT Pub. No.: WO2021/122273
PCT Pub. Date: Jun. 24, 2021

(65) Prior Publication Data
US 2023/0023477 A1    Jan. 26, 2023

(30) Foreign Application Priority Data
Dec. 19, 2019  (FR) ...................................... 1914848

(51) Int. Cl.
*B01D 53/047*    (2006.01)
*B01D 53/00*     (2006.01)
(Continued)

(52) U.S. Cl.
CPC ....... *B01D 53/0476* (2013.01); *B01D 53/002* (2013.01); *F25J 3/0219* (2013.01);
(Continued)

(58) Field of Classification Search
CPC .............. B01D 53/0476; B01D 53/002; B01D 2257/102; B01D 2257/502;
(Continued)

(56) References Cited

U.S. PATENT DOCUMENTS

| 4,542,114 | A |   | 9/1985 | Hegarty |             |
|-----------|---|---|--------|---------|-------------|
| 5,100,635 | A | * | 3/1992 | Krishnamurthy | F25J 3/08 |
|           |   |   |        |         | 423/247     |

(Continued)

FOREIGN PATENT DOCUMENTS

| EP | 1 005 895 | 6/2000 |
| FR | 2 872 890 | 1/2006 |

(Continued)

OTHER PUBLICATIONS

De Mello, L.F., $CO_2$ capture project phase 3—oxyfuel large scale pilot and demonstration projects, $2^{nd}$ Oxyfuel Combustion Conference, Sep. 12-16, 2011, Yeppoon, Queensland, Australia, 20 pages.
(Continued)

*Primary Examiner* — Anthony J Zimmer
*Assistant Examiner* — Abdul-Rahman Yusuf Waleed Smari
(74) *Attorney, Agent, or Firm* — Allen E. White

(57) ABSTRACT

A process for separating carbon dioxide from a waste gas of a fluid catalytic cracking installation including converting at least a portion of the carbon monoxide of the waste gas into carbon dioxide to form a flow enriched in carbon dioxide, separating at least a portion of the flow enriched in carbon dioxide to form a gas enriched in carbon dioxide and depleted in nitrogen and a gas rich in nitrogen and depleted
(Continued)

in carbon dioxide, and at least a portion of the gas enriched in carbon dioxide and depleted in nitrogen is separated by way of separation at a temperature of less than 0° C. to form a fluid rich in carbon dioxide and a fluid depleted in carbon dioxide and sending a gas containing at least 90% oxygen to combustion.

11 Claims, 2 Drawing Sheets

(51) Int. Cl.
  *C10G 11/18* (2006.01)
  *F25J 3/02* (2006.01)
  *F25J 3/06* (2006.01)
(52) U.S. Cl.
  CPC ............ *F25J 3/0266* (2013.01); *F25J 3/062* (2013.01); *F25J 3/067* (2013.01); *B01D 2257/102* (2013.01); *B01D 2257/502* (2013.01); *B01D 2257/504* (2013.01); *C10G 11/185* (2013.01); *F25J 2205/40* (2013.01); *F25J 2205/64* (2013.01); *F25J 2205/66* (2013.01); *F25J 2205/80* (2013.01); *F25J 2205/84* (2013.01); *F25J 2210/04* (2013.01); *F25J 2210/12* (2013.01); *F25J 2230/20* (2013.01); *F25J 2230/30* (2013.01); *F25J 2240/12* (2013.01); *F25J 2240/90* (2013.01); *F25J 2260/80* (2013.01)
(58) Field of Classification Search
  CPC .. B01D 2257/504; F25J 3/0219; F25J 3/0266; F25J 3/062; F25J 3/067; F25J 2205/40; F25J 2205/64; F25J 2205/66; F25J 2205/80; F25J 2205/84; F25J 2210/04; F25J 2210/12; F25J 2230/20; F25J 2230/30; F25J 2240/12; C10G 11/185
  See application file for complete search history.

(56) References Cited

U.S. PATENT DOCUMENTS

| | | |
|---|---|---|
| 5,560,817 A | 10/1996 | Menon et al. |
| 5,565,089 A | 10/1996 | Ramachandran et al. |
| 8,323,602 B2 * | 12/2012 | Wright .................. B01D 53/75 423/220 |
| 2017/0081186 A1 * | 3/2017 | Chambron ............. F25J 3/0252 |

FOREIGN PATENT DOCUMENTS

| | | |
|---|---|---|
| FR | 2 884 304 | 10/2006 |
| FR | 2 884 307 | 10/2006 |
| FR | 2 890 575 | 3/2007 |

OTHER PUBLICATIONS

Sadeghbeigi. R., Fluid catalytic cracking handbook, Ch. 1, pp. 1-36, Gulf Professional Publishing, Houston, Texas, Jun. 8, 2000.
International Search Report for corresponding PCT/EP2020/085450, Mar. 1, 2021.

* cited by examiner

METHOD AND APPARATUS FOR SEPARATING CARBON DIOXIDE FROM A RESIDUAL GAS IN A FLUIDISED BED CATALYTIC CRACKING PLANT (FCC)

CROSS REFERENCE TO RELATED APPLICATIONS

This application is a 371 of International Application No. PCT/EP2020/085450, filed Dec. 10, 2020, which claims priority to French Patent Application No. 1914848, filed Dec. 19, 2019, the entire contents of which are incorporated herein by reference.

BACKGROUND

The present invention relates to a process and an apparatus for separating carbon dioxide from a waste gas of a fluid catalytic cracking installation.

One of the main sources of $CO_2$ emissions in petroleum refining is fluid catalytic cracking, often denoted by the acronym FCC. Cracking produces between 20% and 50% of the refinery emissions and the waste gas it produces contains between 10% and 20% carbon dioxide and often contains carbon monoxide.

Fluid catalytic cracking is a refining process which has the aim of transforming, in the presence of a catalyst, the long-chain hydrocarbon heavy fractions into light fractions in order to be used in the production of fuel.

In the presence of the catalyst, at high temperature (450 to 550° C.) and at a pressure close to atmospheric pressure (typically <5 bar abs), large hydrocarbon molecules are broken in order to obtain small molecules having a high octane number.

The percentages indicating purities in this document are molar percentages, unless otherwise indicated.

The industrial process, known since 1928, is based on the use of a fluidized catalyst bed which circulates between a reactor and a regenerator. The feedstock (typically originating from distillation and vacuum distillation units of the refinery) is injected with the catalyst entering the reactor in a pipeline (also called "riser") in which the cracking reaction takes place. The products of the catalytic cracking reaction exiting the pipeline are separated from the catalyst by means of mechanical separators (typically cyclones) and then are sent into the fractionating tower. During the cracking reaction, coke forms on the surface of the catalyst which flows continuously between the reactor and the regenerator where this coke will be at least partially oxidized, mainly into CO and $CO_2$, by injection of (possibly oxygen-enriched) air.

The catalyst may thus be totally or partially (meaning that the coke is not completely removed) regenerated and then returns to the reactor.

A waste gas, called flue gas, containing carbon dioxide and nitrogen and possibly carbon monoxide, for example between 10% and 20% $CO_2$ and between 0% and 10% carbon monoxide, typically 12.5% $CO_2$, 7.5% CO, 80% $N_2$, all percentages in this document being molar percentages (on a dry basis), is produced in the regenerator.

It is separated again from the catalyst and dust by mechanical gas/solid separators (generally cyclones) in the regenerator and then possibly in an electrostatic precipitator. The conditions of this waste gas at the outlet from the regenerator are typically a temperature of between 50° and 850° C. and a pressure between atmospheric pressure and 5 barg. The examples in this document shall consider as assumptions a temperature of 715° C. and a pressure of 2.4 barg. The waste gas is then expanded (in a turbine or else in a valve) to atmospheric pressure and then, if it contains CO, is treated to convert the carbon monoxide into carbon dioxide by combustion in air in a converter referred to as a "CO boiler". This converter produces heat which is used to produce steam or to heat another fluid (for example hot oil).

In the case of $CO_2$ capture, the prior art then proceeds to treat this waste gas enriched in carbon dioxide by amine scrubbing to remove the carbon dioxide it contains. This scrubbing consumes a great deal of steam which is not necessarily available in excess on site and the production of which consumes fossil fuels.

It is known from U.S. Pat. No. 4,542,114 to modify an FCC to feed the regenerator with an oxidizing gas consisting of a mixture of carbon dioxide (possibly recycled) and between 24% and 30% oxygen instead of air. The gas reacts with the coke to release heat and regenerate the catalyst. The waste gas formed in the regenerator contains 83% carbon dioxide, 9% water, 7% carbon monoxide, 0.5% oxygen, 0.5% sulfur oxides and 500 ppm NOx. The carbon monoxide is oxidized to carbon dioxide in the presence of oxygen. The hot combustion gases are cooled while generating steam. They may then be purified (to remove impurities such as SOx, NOx, and also the oxygen excess and other air gases ($N_2$, Ar)) and possibly compressed and dried (or even liquefied, depending on their final use); "$CO_2$ Capture Project Phase 3-Oxyfuel Large Scale Pilot and Demonstration Projects", $2^{nd}$ Oxyfuel Combustion Conference 2011, describes the operation of an FCC in oxycombustion mode. A portion of the waste gas produced is recycled to the combustion. In this case, the waste gas produced by the regenerator generally comprises between 80 and 98 vol. % carbon dioxide (dry basis).

The FCC processes using oxycombustion in the regenerator entail significant modifications to the core of the process, to the way in which the subtle equilibria of this unit (flow rate of circulating catalyst, heat transfer, residual coke on the catalyst) are regulated in stable operation, and to the way in which the operation of the unit is started/stabilized. This is the reason why FCC operators are currently reluctant concerning this technology which is not yet established on the industrial scale.

In order to overcome these difficulties, the present invention proposes not significantly modifying the core of the FCC process (=the reactor and the regenerator), but treating the waste gas from the regenerator in an innovative way by producing an FCC waste gas 'concentrate' after having converted the carbon monoxide present in the waste gas into $CO_2$ by combustion in the presence of a gas rich in oxygen and a gas containing carbon dioxide which can be a recycle of the flue gases from this converter (before or after treatment of these flue gases) or else a gas produced by separating the gas which comes from the converter.

This separation can be carried out by enriching the waste gas from the converter with $CO_2$ in an adsorption unit.

The advantage is to increase the $CO_2$ concentration of the gas produced by the converter. While this concentration is typically 15-20% for an operation of the CO converter in "air combustion" mode, according to the invention, p reaches a concentration of 20% to 35% $CO_2$ depending on the type of recycling carried out. It is possible to recycle a portion of the flue gas from the CO converter directly or alternatively to recycle a gas produced by separating the flue gas, such as an adsorption unit tail gas or a $CO_2$ rich gas produced by cryogenic separation.

This increase in $CO_2$ concentration makes it easier to separate the $CO_2$ from the rest of the other constituents, and can make it possible to significantly improve the cost and the efficiency of the $CO_2$ capture unit which is placed downstream.

SUMMARY

According to one subject of the invention, a process is provided for separating carbon dioxide from a waste gas of a fluid catalytic cracking installation containing carbon dioxide, nitrogen and carbon monoxide, wherein:
i) at least a portion of the carbon monoxide of the waste gas is converted into carbon dioxide to form a flow enriched in carbon dioxide by combustion,
ii) at least a portion of the flow enriched in carbon dioxide from step i) is separated by adsorption to form a gas enriched in carbon dioxide and depleted in nitrogen and a gas rich in nitrogen and depleted in carbon dioxide, and at least a portion of the gas enriched in carbon dioxide and depleted in nitrogen is separated in a separation apparatus by way of separation at a temperature of less than 0° C. by partial condensation and/or by distillation to form a fluid rich in carbon dioxide and a fluid depleted in carbon dioxide and
iii) a gas containing at least 90% oxygen is sent to the combustion of step i) as is a gas containing at least 40% carbon dioxide, consisting either of a product of the separation of the flow enriched in carbon dioxide, or of a portion of the flow enriched in carbon dioxide.

According to other optional subjects:
the flow enriched in carbon dioxide is separated by distillation and/or by partial condensation and/or by adsorption and/or by absorption in order to produce the product containing at least 40% carbon dioxide,
the flow enriched in carbon dioxide is compressed upstream of step ii) to a pressure of between 2.5 and 10 bar abs,
the gas rich in nitrogen and depleted in carbon dioxide contains less than 5 mol % $CO_2$, indeed even less than 3% $CO_2$, or even less than 1.5% $CO_2$,
the fluid rich in carbon dioxide contains more than 45 mol % $CO_2$, indeed even more than 50% $CO_2$, or even more than 70% $CO_2$, or indeed more than 80% $CO_2$,
the fluid depleted in carbon dioxide contains at most 25% $CO_2$,
the fluid depleted in carbon dioxide is compressed and mixed with the flow enriched in carbon dioxide sent to step ii),
the gas rich in nitrogen and depleted in carbon dioxide is expanded in a turbine and is sent to the atmosphere, possibly after heating,
the gas rich in nitrogen and depleted in carbon dioxide is heated by a fluid originating from the catalytic cracking installation or by at least a portion of the gas enriched in carbon dioxide and depleted in nitrogen or by at least a portion of the waste gas, or at least a portion of the flow enriched in carbon dioxide,
the waste gas is expanded upstream of step i) in a turbine and
the flow enriched in carbon dioxide is compressed in a compressor driven by the turbine upstream of step ii),
an electricity generator and/or a motor is mounted on the same shaft or the same speed-increasing gearing as the compressor for the flow enriched in carbon dioxide upstream of step ii) and the turbine for the waste gas,
the fluid depleted in carbon dioxide is separated in a membrane to produce a permeate enriched in $CO_2$, and the permeate is sent upstream of step ii), the non-permeate is expanded in a turbine and/or mixed with the gas rich in nitrogen and depleted in carbon dioxide and/or used as a regeneration gas for step ii),
the membrane separates the fluid at a temperature of less than −30° C.,
the fluid depleted in carbon dioxide and/or the gas rich in nitrogen and depleted in carbon dioxide is expanded in a turbine to a temperature of less than 0° C. and greater than −100° C. in a chamber containing the separation apparatus,
at least a portion of the gas rich in nitrogen and depleted in carbon dioxide and/or at least a portion of the fluid rich in carbon dioxide and/or at least a portion of the fluid depleted in carbon dioxide is/are sent to the combustion of the carbon monoxide,
the waste gas exiting the regenerator contains less than 70% carbon dioxide, preferably less than 50% carbon dioxide,
the waste gas exiting the regenerator contains more than 50% nitrogen, preferably more than 70% nitrogen.

According to another subject of the invention, there is provided an apparatus for separating carbon dioxide from a waste gas of a fluid catalytic cracking installation containing carbon dioxide, nitrogen and carbon monoxide, comprising a converter capable of converting at least a portion of the carbon monoxide of the waste gas into carbon dioxide to form a flow enriched in carbon dioxide by combustion, a separation unit for separating at least a portion of the flow enriched in carbon dioxide, comprising an adsorption separation unit to form a gas enriched in carbon dioxide and depleted in nitrogen and a gas rich in nitrogen and depleted in carbon dioxide and a separation apparatus for separating at least a portion of the gas enriched in carbon dioxide and depleted in nitrogen by separation at a temperature of less than 0° C. by partial condensation and/or by distillation, to form a fluid rich in carbon dioxide and a fluid depleted in carbon dioxide and means for sending a gas containing at least 90% oxygen to the converter to take part in the combustion and means for sending to the converter a gas containing at least 40% carbon dioxide, consisting either of a product of the separation of the flow enriched in carbon dioxide, or of a portion of the flow enriched in carbon dioxide.

The adsorption separation unit can be a PSA or a VPSA.
The apparatus may comprise a fluid catalytic cracking unit comprising a reactor and a regenerator.

BRIEF DESCRIPTION OF THE DRAWINGS

For a further understanding of the nature and objects for the present invention, reference should be made to the following detailed description, taken in conjunction with the accompanying drawings, in which like elements are given the same or analogous reference numbers and wherein.

DETAILED DESCRIPTION OF PREFERRED EMBODIMENTS

Figure 1:
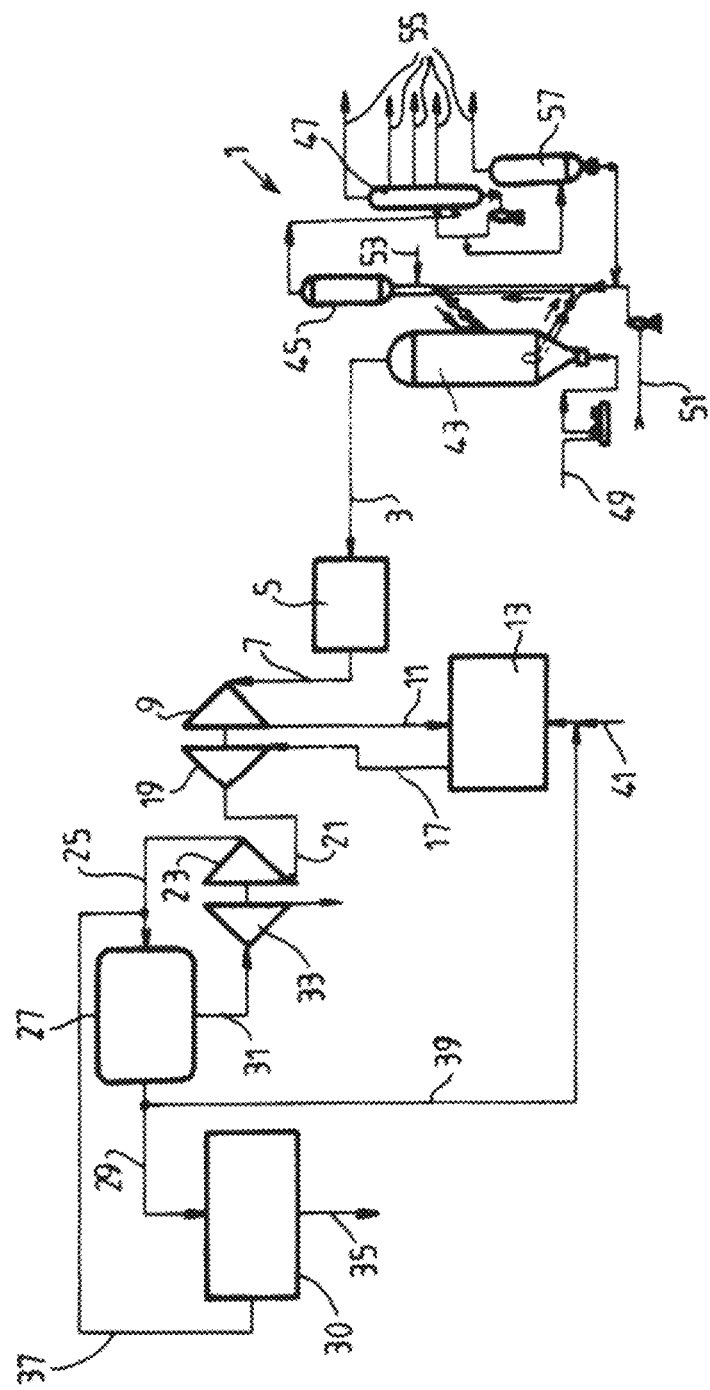
FIG. 1 represents a process according to the invention.

The unit 1 is a fluid catalytic cracking unit of a refinery. It comprises a reactor 45 and a regenerator 43. In this process, the catalyst flows continuously between the reactor 45 and the regenerator 43 into which combustion air 49 is blown, and then returns to the reactor 45 after having been freed of the coke which has accumulated on the catalyst during the reaction. The reactor 45 is fed with steam 53.

The air 49 may possibly be enriched in oxygen so as to contain at most 30% oxygen, without significantly modifying the structure of the unit 1 and the processes performed in the unit 1.

After passage of the feedstocks 51 into the reactor 45, the effluents are guided to the main fractionating tower 47 in order to form the products 55 of the FCC.

The bottom liquid of the tower 47 is sent to a particulate separator 57. The functioning of the unit 1 is well known per se and for more details reference may be made to "Fluid Catalytic Cracking Technology and Operations" by Wilson, 1997, or "Fluid Catalytic Cracking Handbook" by Sadeghbeigi, 2000.

The waste gas 3 extracted from the regenerator 43 contains carbon monoxide, carbon dioxide and nitrogen, and also dust. After separation of the dust in the filter 5, a purified gas 7 is produced containing for example 80% nitrogen, 12.5% carbon dioxide and 7.5% carbon monoxide. This gas 7 is at 3.5 bar and 650° C. and is expanded in a turbine 9 or in a valve to a pressure close to atmospheric pressure and a temperature of approximately 450° C. This expanded gas 11 is sent to a conversion unit 13 referred to as a "CO boiler", where the carbon monoxide in the gas 11 is converted into carbon dioxide, at least partially by combustion with oxygen 41. The gas flow 41 contains at least 90% oxygen, or even at least 99.5% oxygen and can come from an air distillation separation apparatus.

The oxygen 41 is preferably mixed upstream of the combustion with a gas flow 39 containing at least 40% carbon dioxide and/or with a recycle of flue gas (=waste at the output of the CO converter). In FIG. 1, this flow constitutes a portion of the gas 29 produced by the adsorption unit 27 and intended for the separation unit 30. In this example, the flow 39 is at 1.05 bar and contains 67% $CO_2$. At least a portion of the fluid 39 is mixed with oxygen 41 to form the oxidant used by the conversion unit 13.

Alternatively, another flow containing at least 40% carbon dioxide derived from the flow 17, 21 can replace the flow 39 or be mixed therewith.

In addition or alternatively, a portion of the fluid 35 and/or at least a portion of the fluid 37 may be sent to the conversion unit 13.

Figure 2:
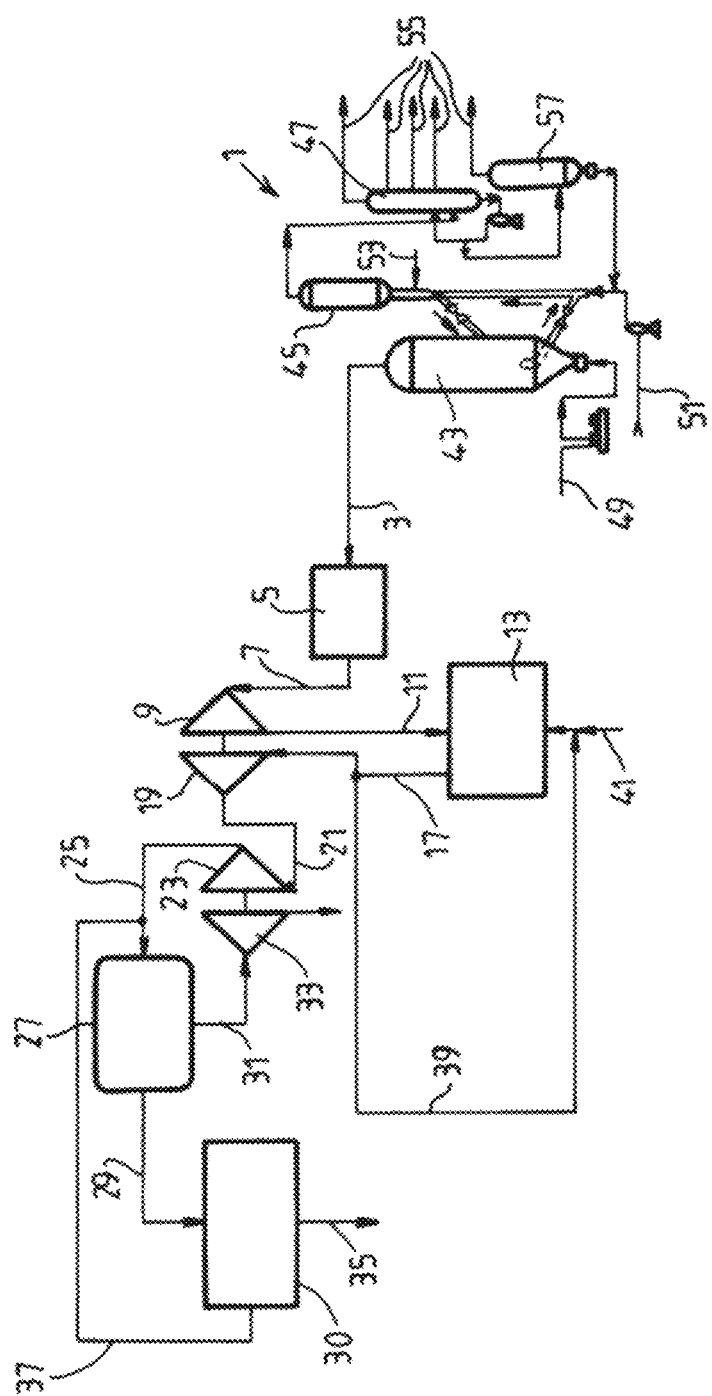
FIG. 2 represents a process according to the invention.

In FIG. 2, the flow 39 is a recycle which consists of a portion of the gas 17 taken at the outlet of the converter 13 intended for the separation unit 27. In this example, the flow 39 is at 1.05 bar and contains 20% $CO_2$. A portion 39 of the fluid 17 is mixed with oxygen 41 to form the oxidant used by the conversion unit 13.

The conversion process also produces steam.

In addition to producing a waste 17 which is richer in carbon dioxide than a converter according to the prior art, the process makes it possible to increase the temperature of the flame in the converter 13 (while having an oxidant which is richer in $O_2$), which makes it possible to produce steam at a higher pressure and/or at a higher temperature while at the same time increasing the efficiency of the production of steam. The unit 27 and the unit 30 of FIG. 2 will be all the smaller as the waste gas is enriched in carbon dioxide.

Thus, produced in FIG. 2 is a gas 17 at atmospheric pressure and around 120° C. containing 26% $CO_2$, 3% oxygen and 71% nitrogen. The gas 17 is possibly filtered and then compressed in a compressor 19 coupled to the turbine 9 to produce a compressed gas 21.

An electricity generator and/or a motor may also be provided on the same shaft as the compressor 19 and the turbine 9. The stages of compression and expansion may be mounted on an integrated speed-increasing gearing ("integrally geared" centrifugal device).

The compressed gas 21 is then compressed in a compressor 23 to between 2.5 and 10 bar, for example at least 8 bar and at least 30° C. as gas 25. The gas 25 feeds a unit for separation by pressure swing adsorption 27, generally known under the acronym PSA. There, it is separated to form a gas enriched in carbon dioxide and depleted in nitrogen and oxygen 29 (constituting a tail gas) and a gas rich in nitrogen, enriched in oxygen and depleted in carbon dioxide 31 (constituting the product gas). The gas 31 at approximately 8 bar is expanded (possibly after preheating) in a turbine 33 coupled to the compressor 23 and is released to the atmosphere with a composition of 97% nitrogen and 3% carbon dioxide. The gas 31 comprises at most 5% carbon dioxide, or at most 3% carbon dioxide, indeed even at most 1.5% carbon dioxide.

This expansion in the turbine 33 can be done after heating the gas 31. It may be heated with a hot fluid from the catalytic cracking installation 1 and/or by exchange with a fluid exiting a compression stage upstream of the adsorption unit 27 or upstream of the unit 30. It may even be possible to have two turbine stages in series with intermediate heating in order to maximize the recovery of energy at the shaft of the turbine.

The unit 27 may be a unit for separation by vacuum pressure swing adsorption, generally known under the acronym VPSA. In this case, the gas 21 is compressed less, but the unit comprises vacuum pumps. The purity of the gas 29 will be higher in $CO_2$ and the electrical consumption of the unit 27 may be lower.

The gas 29 containing between 65% and 70% carbon dioxide and between 30% and 35% nitrogen and around 1% oxygen is compressed to a pressure of greater than 15 bar abs and preferentially between 20 and 30 bar abs (the compressor is included in the unit 30), dried and then cooled in a separation apparatus 30 to a temperature of less than 0° C. by partial condensation and/or by distillation to form a fluid rich in carbon dioxide 35 and a fluid depleted in carbon dioxide 37. The gas 29 may contain at least 60% $CO_2$, or at least 70% $CO_2$, or at least 80% $CO_2$.

The fluid 35 contains at least 70%, and preferentially at least 95%, carbon dioxide in liquid or gaseous form. The fluid 37 contains between 18% and 28% carbon dioxide and also nitrogen and oxygen and is recycled upstream of the adsorption unit 27 to join the gas 25 as feed flow. Before being mixed with the flow 25, the fluid 37 can be expanded in a valve or a turbine.

Optionally, the fluid depleted in carbon dioxide 37 is separated in a membrane to produce a permeate enriched in $CO_2$. The permeate can be sent to the adsorption unit 27 as a feed gas to be separated. The residue can be expanded in a turbine and/or mixed with the gas rich in nitrogen and depleted in carbon dioxide 31 and/or used as a regeneration gas for step ii).

The membrane may optionally separate the fluid 37 at a temperature of less than −30° C.

The fluid depleted in carbon dioxide 37 and/or the gas rich in nitrogen and depleted in carbon dioxide 31 may be expanded in a turbine to a temperature of less than 0° C. and greater than −100° C. in a chamber containing the separation apparatus 30. It thus contributes to the production of the required frigories.

A dryer for the flow 25 may be installed upstream of the unit 27. A separation unit utilizing activated carbon may be installed on the flow 29 upstream of the unit 30 or on the flow 25 upstream of the unit 27 in order to remove impurities.

In all the figures, the flow enriched in carbon dioxide 17 can be separated by distillation and/or by partial condensation and/or by adsorption and/or by absorption to produce the product containing at least 40% carbon dioxide recycled to the converter 13.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

The invention claimed is:

1. A process for separating carbon dioxide from a waste gas of a fluid catalytic cracking installation containing carbon dioxide, nitrogen and carbon monoxide, the process comprising:
   i) converting at least a portion of the carbon monoxide of the waste gas into carbon dioxide to form a flow enriched in carbon dioxide by combustion,
   ii) separating at least a portion of the flow enriched in carbon dioxide from step i) by adsorption to form a gas enriched in carbon dioxide and depleted in nitrogen and a gas rich in nitrogen and depleted in carbon dioxide, and at least a portion of the gas enriched in carbon dioxide and depleted in nitrogen is separated in a separation apparatus at a temperature of less than 0° C. by partial condensation and/or by distillation to form a fluid rich in carbon dioxide and a fluid depleted in carbon dioxide and
   iii) sending a gas containing at least 90% oxygen and a gas containing at least 40% carbon dioxide, consisting either of a product of the separation of the flow enriched in carbon dioxide, or of a portion of the flow enriched in carbon dioxide, to the combustion of step i).

2. The process as claimed in claim 1, wherein the gas rich in nitrogen and depleted in carbon dioxide contains less than 5 mol % $CO_2$.

3. The process as claimed in claim 1, wherein the fluid rich in carbon dioxide contains more than 45 mol % $CO_2$.

4. The process as claimed in claim 1, wherein the fluid depleted in carbon dioxide is compressed and mixed with the flow enriched in carbon dioxide sent to step ii).

5. The process as claimed in claim 1, wherein the gas rich in nitrogen and depleted in carbon dioxide is expanded in a turbine and is sent to the atmosphere.

6. The process as claimed in claim 5, wherein the gas rich in nitrogen and depleted in carbon dioxide is heated by a fluid originating from the catalytic cracking installation or by at least a portion of the gas enriched in carbon dioxide and depleted in nitrogen or by at least a portion of the waste gas, or at least a portion of the flow enriched in carbon dioxide.

7. The process as claimed in claim 1, wherein the waste gas is expanded upstream of step i) in a turbine and the flow enriched in carbon dioxide is compressed in a compressor driven by the turbine upstream of step ii).

8. The process as claimed in claim 7, wherein the compressor for the flow enriched in carbon dioxide upstream of step ii) and the turbine for the waste gas are mounted on a shaft or a speed-increasing gearing, and wherein an electricity generator and/or a motor is mounted on the shaft or the speed-increasing gearing.

9. The process as claimed in claim 1, wherein the fluid depleted in carbon dioxide and/or the gas rich in nitrogen and depleted in carbon dioxide is expanded in a turbine to a temperature of less than 0° C. and greater than −100° C. in a chamber containing the separation apparatus.

10. The process as claimed in claim 1, wherein at least a portion of the gas rich in nitrogen and depleted in carbon dioxide and/or at least a portion of the fluid rich in carbon dioxide and/or at least a portion of the fluid depleted in carbon dioxide is/are sent to the combustion of the carbon monoxide.

11. The process as claimed in claim 1, wherein the waste gas leaving a regenerator of the fluid catalytic cracking installation contains more than 50% nitrogen.

* * * * *